(12) United States Patent
Malhotra et al.

(10) Patent No.: US 11,012,857 B1
(45) Date of Patent: May 18, 2021

(54) FIFTH GENERATION CORE (5GC) AUTHENTICATION FOR LONG TERM EVOLUTION (LTE) DATA SERVICE

(71) Applicant: Sprint Communications Company L.P., Overland Park, KS (US)

(72) Inventors: Rajil Malhotra, Olathe, KS (US); Anuj Sharma, Broadlands, VA (US); Anil Kumar Mariyani, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/847,304

(22) Filed: Apr. 13, 2020

(51) Int. Cl.
| | |
|---|---|
| *H04M 3/16* | (2006.01) |
| *H04W 12/06* | (2021.01) |
| *H04W 8/08* | (2009.01) |
| *H04W 12/72* | (2021.01) |

(52) U.S. Cl.
CPC ............. *H04W 12/06* (2013.01); *H04W 8/08* (2013.01); *H04W 12/72* (2021.01)

(58) Field of Classification Search
CPC ........ H04W 12/06; H04W 12/72; H04W 8/08
USPC ......................................................... 455/411
See application file for complete search history.

(56) References Cited

U.S. PATENT DOCUMENTS

| | | | |
|---|---|---|---|
| 9,730,072 B2 | 8/2017 | Yang et al. | |
| 10,764,721 B1 * | 9/2020 | Huang | H04W 36/0055 |
| 2019/0124181 A1 | 4/2019 | Park et al. | |
| 2019/0174314 A1 | 6/2019 | Joseph et al. | |
| 2019/0230645 A1 | 7/2019 | Cheng et al. | |
| 2019/0268335 A1 | 8/2019 | Targali | |
| 2020/0068391 A1 * | 2/2020 | Liu | H04L 9/30 |
| 2020/0259896 A1 * | 8/2020 | Sachs | H04W 4/30 |
| 2020/0359218 A1 * | 11/2020 | Lee | H04L 9/3213 |

FOREIGN PATENT DOCUMENTS

| | | |
|---|---|---|
| EP | 2146534 A1 | 1/2010 |
| EP | 3198906 A1 | 8/2017 |
| WO | 2017120243 A1 | 7/2017 |
| WO | 2018053271 A1 | 3/2018 |
| WO | 2019183794 A1 | 10/2019 |
| WO | 2019193107 A1 | 10/2019 |
| WO | 2019194155 A1 | 10/2019 |

* cited by examiner

*Primary Examiner* — Amancio Gonzalez (57) ABSTRACT

A Fifth Generation Core (5GC) Long Term Evolution (LTE) network authenticates a wireless User Equipment (UE) for LTE data service using a 5GC Subscriber Concealed Identifier (SUCI). A Mobility Management Entity (MME) receives the 5GC SUCI and transfers the 5GC SUCI to a 5GC authentication system. The 5GC authentication system determines a 5GC Subscriber Permanent Identifier (SUPI) and authentication vector based on the 5GC SUCI. The 5GC authentication system transfers the 5GC SUPI and the 5GC authentication vector to the MME. The MME exchanges 5GC authentication data with the UE. The MME authenticates the UE based on the 5GC authentication vector and the 5GC authentication data. In response to the 5GC authentication, the MME initiates the LTE data service for the UE based on the 5GC SUPI.

20 Claims, 8 Drawing Sheets

FIFTH GENERATION CORE (5GC) AUTHENTICATION FOR LONG TERM EVOLUTION (LTE) DATA SERVICE

TECHNICAL BACKGROUND

Wireless communication networks provide wireless data services to wireless user devices. Exemplary wireless data services include machine-control, Internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). In some examples, both LTE and 5GNR networks serve the same wireless user device at the same time with an integrated data service called dual-connectivity.

The wireless communication networks authenticate the wireless user devices before delivering non-emergency data services to the user devices. A given wireless user device and its wireless communication network share a secret key that identifies the user device. To authenticate the wireless user device, the wireless communication network hashes the secret key with a random number to generate an expected result. The wireless communication network transfers the random number to the wireless user device. The wireless user device hashes its secret key with the random number and returns the hash to the wireless communication network. The wireless communication network matches the hash from the wireless user device to the expected result to authenticate the wireless user device. After successful authentication, the wireless communication network delivers various data services to the wireless user device.

In 5GNR networks, the 5GNR user devices and encrypt their device identifiers for transfer over-the-air. The encrypted device identifiers are referred to as Subscriber Concealed Identifiers (SUCIs). The decrypted version of the SUCIs are referred to as Subscriber Permanent Identifiers (SUPIs). The SUPIs may be International Mobile Subscriber Identifiers (IMSIs). 5GNR networks use the 5GNR SUCIs to authenticate 5GNR user devices for 5GNR data services.

Unfortunately, LTE networks do not effectively use these 5GNR SUCIs to authenticate LTE user devices for LTE data services. Moreover, the LTE networks do not efficiently use the 5GNR SUCIs to control the Quality-of-Service (QoS) for the LTE data services that are delivered to the LTE user devices.

Technical Overview

A Fifth Generation Core (5GC) Long Term Evolution (LTE) network authenticates a wireless User Equipment (UE) for LTE data service using a 5GC Subscriber Concealed Identifier (SUCI). A Mobility Management Entity (MME) receives the 5GC SUCI and transfers the 5GC SUCI to a 5GC authentication system. The 5GC authentication system determines a 5GC Subscriber Permanent Identifier (SUPI) and 5GC authentication vector based on the 5GC SUCI. The 5GC authentication system transfers the 5GC SUPI and the 5GC authentication vector to the MME. The MME exchanges 5GC authentication data with the UE. The MME authenticates the UE based on the 5GC authentication vector and the 5GC authentication data. In response to the 5GC authentication, the MME initiates the LTE data service for the UE based on the 5GC SUPI.

DETAILED DESCRIPTION

Figure 1:
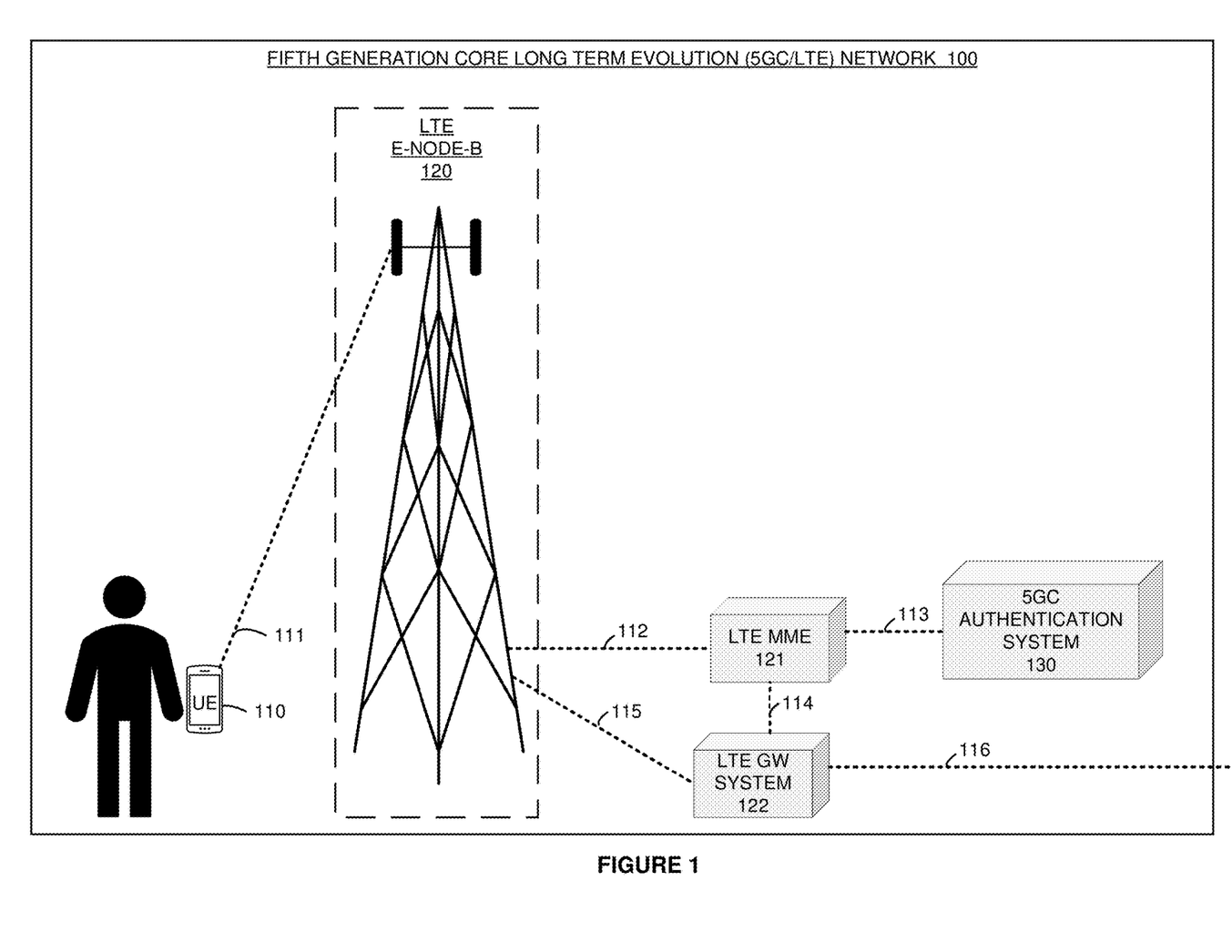
FIG. 1 illustrates a Fifth Generation Core (5GC) Long Term Evolution (LTE) network to authenticate a wireless User Equipment (UE) for LTE data service using a 5GC Subscriber Concealed Identifier (SUCI).

FIG. 1 illustrates Fifth Generation Core (5GC) Long Term Evolution (LTE) network 100 to authenticate wireless User Equipment (UE) 110 for LTE data service using a 5GC Subscriber Concealed Identifier (SUCI). 5GNR/LTE network 100 comprises wireless UE 110, LTE evolved NodeB (eNodeB) 120, LTE Mobility Management Entity (MME) 121, LTE Gateway (GW) system 122, and 5GC authentication system 130. Although wireless UE 110 is depicted as a smartphone operated by a human, wireless UE 110 might instead comprise a computer, robot, vehicle, or some other data appliance with wireless communication circuitry that may or may not be operated by a human. LTE eNodeB 120 is depicted with a radio tower, but eNodeB 120 may use other mounting structures or no mounting structure at all.

Various examples of network operation and configuration are described herein. In one example, wireless UE 110 transfers its 5GC SUCI to LTE eNodeB 120. LTE eNodeB 120 transfers the 5GC SUCI to LTE MME 121. LTE MME 121 transfers the 5GC SUCI to 5GC authentication system 130. 5GC authentication system 130 processes the 5GC SUCI to determine a 5GC Subscriber Permanent Identifier (SUPI) and a 5GC authentication vector. 5GC authentication system 130 typically uses a secret identifier for UE 110 to generate the authentication vector. 5GC authentication system 130 transfers the 5GC SUPI and the 5GC authentication vector to LTE MME 121. LTE MME 121 exchanges 5GC authentication data with wireless UE 110 over LTE eNodeB 120. Wireless UE 110 typically uses the secret identifier to generate a hash result that is transported in the authentication data. LTE MME 121 authenticates wireless UE 110 based on the 5GC authentication data and the 5GC authentication vector. In response to the 5GC authentication, LTE MME 121 transfers LTE signaling to LTE eNodeB 120 and LTE gateway system 122 to serve the LTE data service to UE 110 based on its 5GC SUPI. Using the LTE data service, wireless UE 110 exchanges user data with external systems over LTE eNodeB 120 and LTE GW system 122.

Wireless UE 110 and LTE eNodeB 120 communicate over LTE link 111. LTE link 111 uses over-the-air air electromagnetic frequencies in the low-band, mid-band, high-band, or some other portion of the electromagnetic spectrum. LTE eNodeB 120 and LTE MME 121 communicate over backhaul link 112. LTE MME 121 and 5GC authentication system 130 communicate over network link 113. LTE MME 121 and LTE GW system 122 communicate over network link 114. LTE eNodeB 120 and LTE GW system 122 communicate over backhaul link 115. LTE GW system 122 and external systems communicate over external link 116. Links 112-116 use metal, glass, air, or some other media. Data links 112-116 use Institute of Electrical and Electronic Engineers (IEEE) 802.3 (Ethernet), Time Division Multiplex (TDM), Data Over Cable System Interface Specification (DOCSIS), Internet Protocol (IP), 5GC, Fifth Generation New Radio (5GNR), LTE, IEEE 802.11 (WIFI), virtual switching, inter-processor communication, bus interfaces, and/or some other data communication protocol. Links 111-116 may comprise intermediate network elements like routers and controllers.

LTE eNodeB 120, MME 121, GW system 122, and 5GC authentication system 130 comprise microprocessors, memories, software, transceivers, bus circuitry, and the like. The microprocessors comprise Digital Signal Processors (DSP), Central Processing Units (CPUs), Graphical Processing Units (GPU), Application-Specific Integrated Circuits (ASIC), and/or the like. The memories comprise Random Access Memory (RAM), flash circuitry, disk drives, and/or the like. The memories store software like operating systems and network applications. The microprocessors retrieve the software from the memories and execute the software to drive the operation of 5GC/LTE network 100 as described herein.

Figure 2:
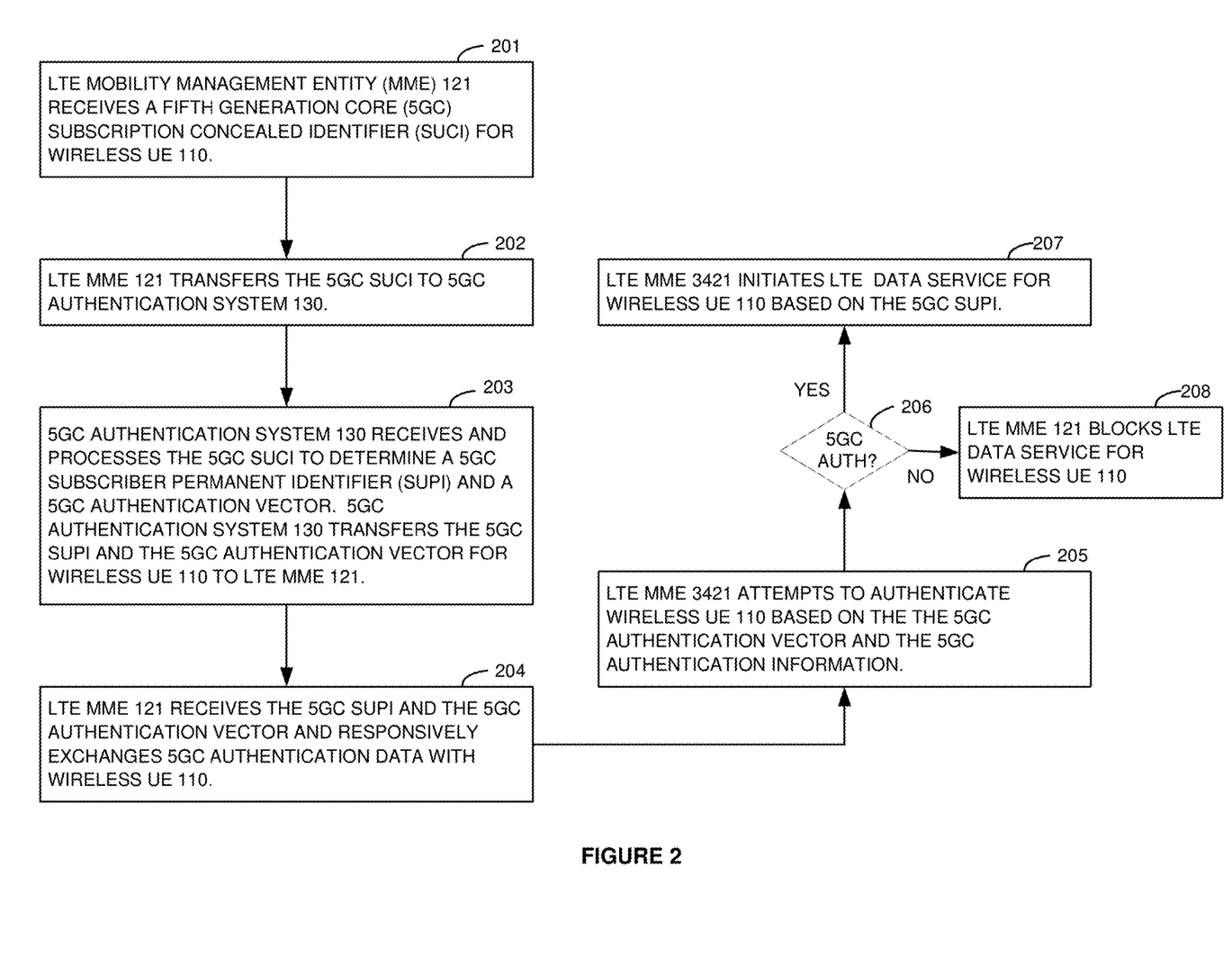
FIG. 2 illustrates an exemplary operation of the 5GC/LTE network to authenticate the wireless UE for LTE data service using the 5GC SUCI.

FIG. 2 illustrates an exemplary operation of 5GC/LTE network 100 to authenticate wireless UE 110 for the LTE data service using the 5GC SUCI. LTE MME 121 receives the 5GC SUCI for wireless UE 110 from an LTE eNodeB, a roaming gateway, or some other network element (201). LTE MME 121 transfers the 5GC SUCI to 5GC authentication system 130 (202). 5GC authentication system 130 receives and processes the 5GC SUCI to determine a 5GC Subscriber Permanent Identifier (SUPI) and a 5GC authentication vector for wireless UE 110 (203). The 5GC authentication vector may comprise an authentication token, random number, expected result for UE 110, or and/some other security data. 5GC authentication system 130 transfers the 5GC SUPI and the 5GC authentication vector to LTE MME 121 (203). LTE MME 121 receives the 5GC SUPI and the 5GC authentication vector from the 5GC authentication system 130, and in response, LTE MME 121 exchanges 5GC authentication data with wireless UE 110 over LTE eNodeB 120 (204). The 5GC authentication data may comprise the authentication token and random number from the authentication vector.

LTE MME 121 attempts to authenticate wireless UE 110 based on the 5GC authentication data and the 5GC authentication vector (205). When 5GC authentication (AUTH) is successful (206), LTE MME 121 initiates the LTE data service for wireless UE 110 based on the 5GC SUPI (207). The quality of the LTE data service may be controlled by the 5G SUPI if desired. For example, LTE MME 121 may compare a hash result from UE 110 to the expected result from the 5GC authentication vector, and if the two items match, LTE MME 121 accesses a Home Subscriber System (HSS) to translate the decrypted International Mobile Subscriber Identifier (IMSI) for UE 110 into Access Point Names (APNs) for the LTE data service. When 5GC authentication is unsuccessful (206), LTE MME 121 blocks the LTE data service for wireless UE 110 (208). For example, LTE MME 121 may detect a mismatch between the hash result and the expected result and responsively direct LTE eNodeB 121 and LTE GW system 122 to hotline wireless UE 110 to a subscriber help server.

Figure 3:
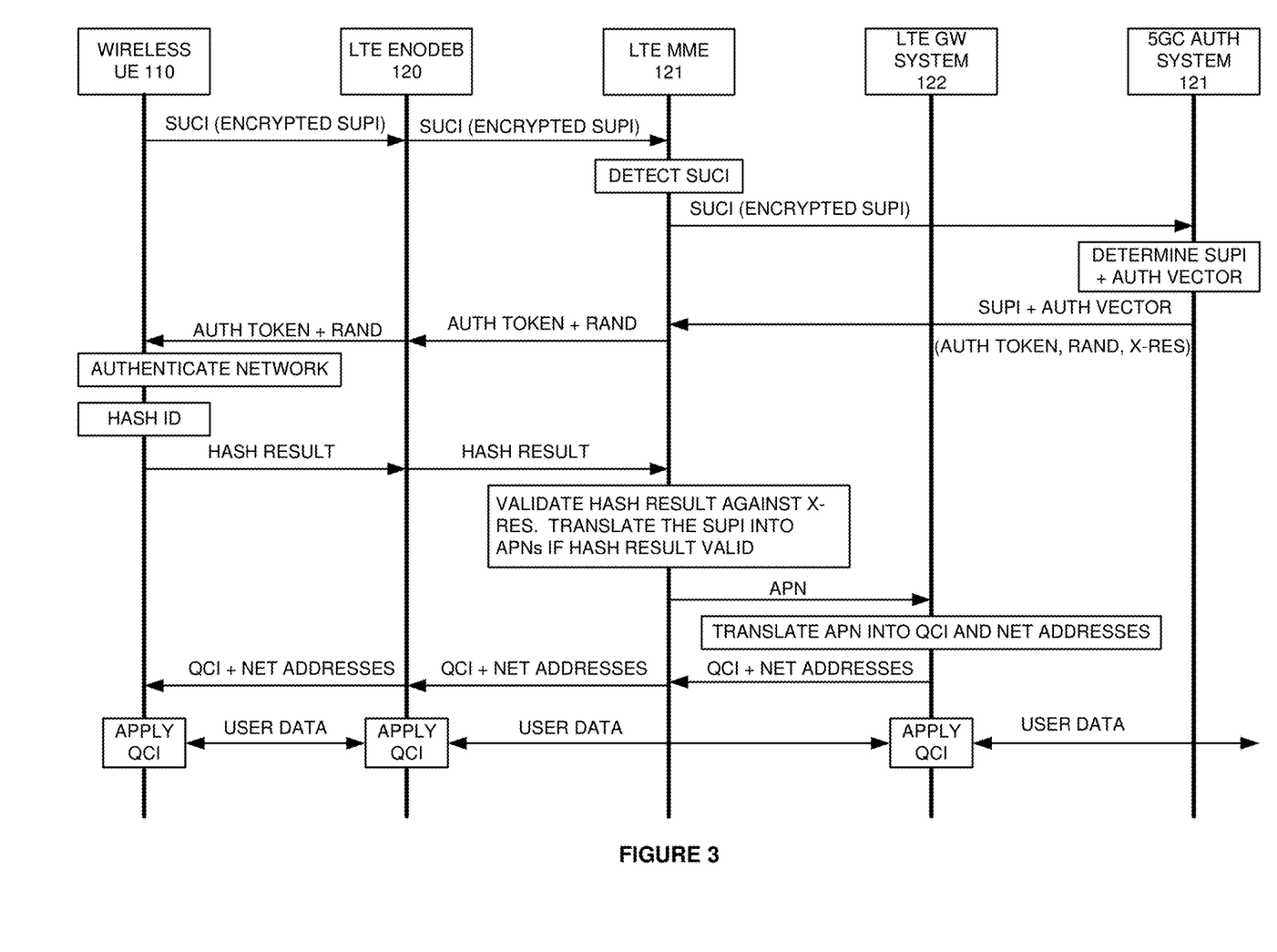
FIG. 3 illustrates an exemplary operation of the 5GC/LTE network to authenticate the wireless UE for LTE data service using the 5GC SUCI.

FIG. 3 illustrates an exemplary operation of 5GC/LTE 100 network to authenticate wireless UE 110 for the LTE data service using the 5GC SUCI. Wireless UE 110 transfers its 5GC SUCI to LTE eNodeB 120. In this example, the 5GC SUCI comprises an encrypted version of the 5GC SUPI for wireless UE 110. LTE eNodeB 120 transfers the 5GC SUCI to LTE MME 121. LTE MME 121 transfers the 5GC SUCI to 5GC authentication system 130. 5GC authentication system 130 processes the 5GC SUCI to determine the 5GC SUPI and the 5GC authentication vector. The 5GC authentication vector comprises an authentication (AUTH) token, random number (RAND), and an expected hash result (X-RES) for UE 110. 5GC authentication system 130 transfers the 5GC SUPI and the 5GC authentication vector to LTE MME 121.

LTE MME 121 transfers the 5GC authentication token and random number to LTE eNodeB for delivery to UE 110. LTE eNodeB 122 wirelessly transfers the 5GC authentication token and random number to wireless UE 110. Wireless UE 110 processes the authentication token to authenticate 5GC/LTE network 100. For example, UE 110 may decrypt the authentication token into an identifier for 5GC/LTE network 100. Wireless UE 110 hashes its identifier with the random number. Wireless UE wirelessly transfers the hash result to eNodeB 120 which transfers the hash result to LTE MME 121. LTE MME 121 matches the hash result to the expected result to validate the hash result and authenticate wireless UE 110. In response to the 5GC authentication, LTE MME 121 translates the SUPI into at least one Access Point Name (APN). LTE MME 121 transfers LTE signaling to LTE gateway system 122 to initiate LTE data service for wireless UE 110 based on the APN. LTE GW system 122 translates the APN into a Quality-of-Service Class Identifier (QCI) and network addresses. LTE GW system 122 transfers the QCI and network addresses to LTE MME 121. LTE MME 121 transfers LTE signaling to LTE eNodeB 120 to indicating the QCI and network addresses for UE 110. LTE eNodeB 120 transfers LTE signaling to UE 110 indicating the QCI and network addresses. Using the network addresses, wireless UE 110, LTE eNodeB 120, and LTE GW system 122 exchange user data per the QCI.

Advantageously, wireless UE 110 receives the LTE data service based on its 5GC SUCI. For user security, the 5GC SUCI may be encrypted over the air and over the backhaul links. Moreover, the QoS for the LTE data service can be derived from the 5GC SUCI to differentiate QoS from other UEs.

Figure 4:
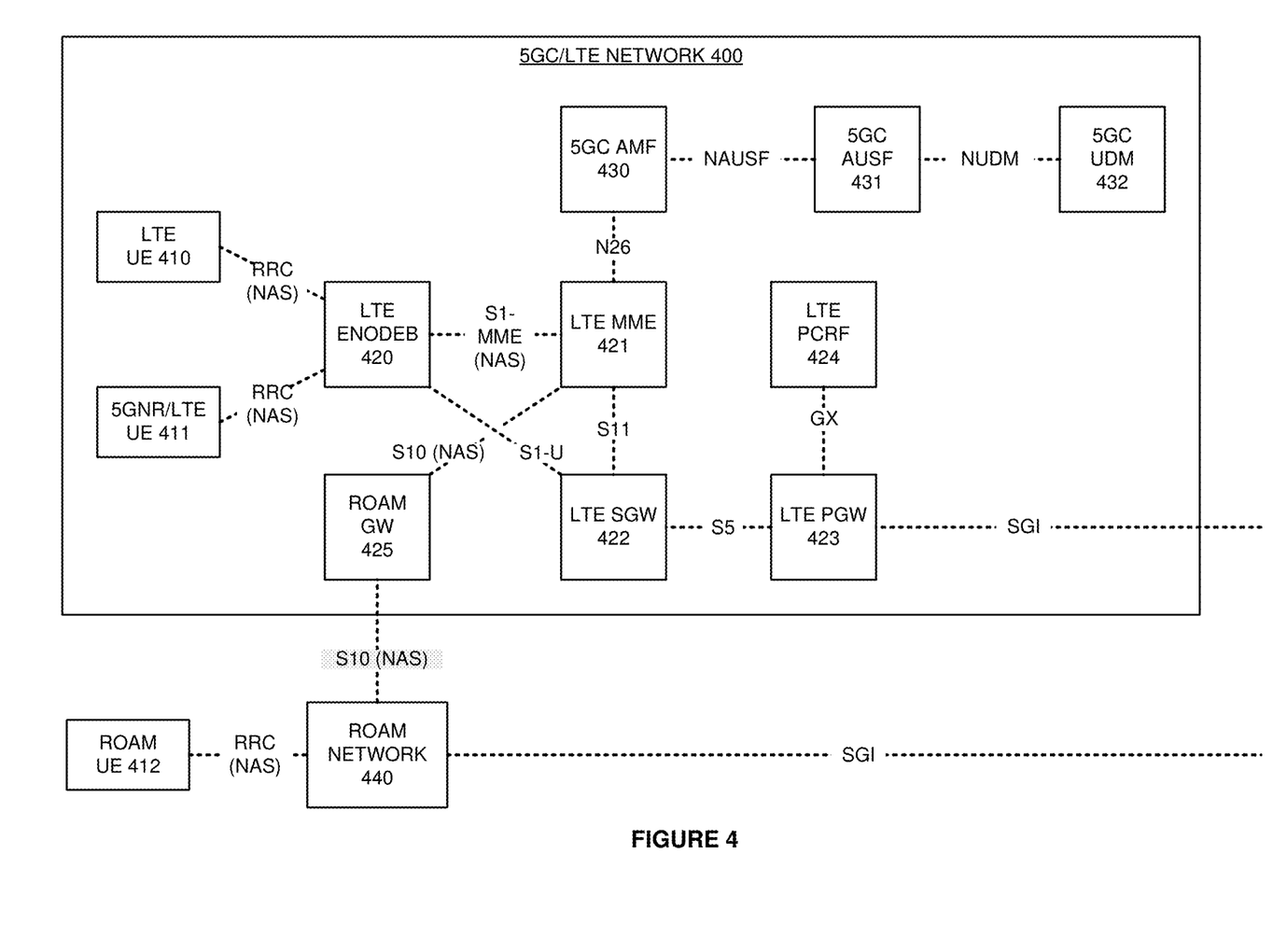
FIG. 4 illustrates a 5GC/LTE network to authenticate UEs for LTE data service using 5GC SUCIs that comprise encrypted 5GC International Mobile Subscriber Identifier (IMSIs).

FIG. 4 illustrates 5GC/LTE network 400 to authenticate UEs 410-412 for LTE data service using 5GC SUCIs that have encrypted International Mobile Subscriber Identifiers (IMSIs). 5GC/LTE network 400 is an example of 5GC/LTE network 100, although network 100 may differ. 5GC/LTE network 400 comprises LTE UE 410, 5GNR/LTE UE 411, LTE eNodeB 420, LTE MME 421, LTE Serving Gateway (SGW) 422, LTE Packet Data Network Gateway (PGW) 423, LTE Policy Charging Rules Function (PCRF) 424, roaming GW 425, 5GC Access and Mobility Management Function (AMF) 430, 5GC Authentication and Security Function (AUSF) 431, and Unified Data Manager (UDM) 432. Roaming GW 425 is coupled to roaming network 440, and roaming UE 412 is wirelessly coupled to roaming network 440. MME 421, SGW 422, PGW 423, PCRF 424, roaming GW 425, AMF 430, AUSF 431, and UDM 432 comprise Virtual Network Functions (VNFs) that execute in a Network Function Virtualization Infrastructure (NFVI).

LTE UE 410 transfers its 5GC SUCI to LTE MME 421 over LTE eNodeB 420 in a Non-Access Stratum (NAS) file that traverses the wireless Radio Resource Control (RRC) link and the S1-MME link. In response to the 5GC SUCI, LTE MME 121 transfers the 5GC SUCI to 5GC AMF 430 over the 5GC N26 link. 5GC AMF 430 transfers the 5GC SUCI to 5GC AUSF 431 over the Nausf link. 5GC AUSF 431 transfers the 5GC SUCI to 5GC UDM 432 over the Nudm link. 5GC UDM 432 decrypts the 5GC SUCI into the 5GC SUPI which is the IMSI for UE 410 in this example. 5GC UDM 432 generates a 5GC authentication vector for the IMSI using a random number and a secret key for UE 410. 5GC UDM 432 transfers the 5GC IMSI and the 5GC authentication vector to 5GC AUSF 431 over the Nudm link. 5GC AUSF 431 transfers the 5GC IMSI and the 5GC authentication vector to 5GC AMF 430 over the Nausf link. 5GC AMF 430 transfers the 5GC IMSI and the 5GC authentication vector to LTE MME 421 over the N26 link. LTE MME 421 transfers a 5GC authentication token and the random number to LTE eNodeB 420 for delivery to LTE UE 410. LTE eNodeB 122 wirelessly transfers the 5GC authentication token and random number to LTE UE 410. LTE UE 410 processes the authentication token to authenticate 5GC/LTE network 400. LTE UE 410 hashes its secret key with the random number. LTE UE 410 wirelessly transfers the hash result to LTE eNodeB 420 which transfers the hash result to LTE MME 421. LTE MME 421 matches the hash result to the expected result to authenticate LTE UE 410.

In response to the 5GC authentication, LTE MME 421 translates the IMSI into APNs —usually by accessing a Home Subscriber System (HSS). LTE MME 121 transfers S11 signaling to LTE SGW 422 indicating the IMSI and APNs. LTE SGW 422 transfers S5 signaling to LTE PGW 423 indicating the IMSI and APNs. LTE PGW 423 transfers Gx signaling to LTE PCRF 424 indicating the IMSI and APNs. LTE PCRF 424 translates the IMSI and the APNs into Quality-of-Service Class Identifiers (QCIs) and returns the QCIs. LTE PGW 423 selects Internet Protocol (IP) addresses for LTE/IP tunnels between LTE UE 410 and LTE PGW 423. LTE PGW 423 transfers the QCIs and IP addresses to LTE SGW 422. LTE SGW 422 transfers the QCIs and IP addresses to LTE MME 421. LTE MME 421 also transfers S1—MME signaling to LTE eNodeB 420 indicating the QCIs and network addresses for LTE UE 410. LTE eNodeB 420 transfers RRC signaling to LTE UE 410 indicating its QCIs and IP addresses for the LTE data service. Using the IP addresses, LTE UE 410, LTE eNodeB 420, LTE SGW 422, and LTE PGW 423 exchange user data per the QCIs.

5GNR/LTE UE 411 receives both LTE service and 5GNR service, but LTE UE 410 does not receive the 5GNR service. The authentication for 5GNR/LTE UE 411 would be similar to the authentication for LTE UE 410 because the 5GNR radios and circuitry are not used—the 5GC SUPI is still used.

The authentication for roaming UE 412 could be similar to the authentication for LTE UE 410. Roaming UE 412 would attach to roaming network 440 and transfer its 5GC SUCI to roaming network 440. Roaming network 440 transfers the 5GC SUCI for roaming UE 412 to roaming gateway 425 over the S10 link. Roaming GW 425 transfers the 5GC SUCI for roaming UE 412 to LTE MME 421 over the S10 link. LTE MME 421 handles the 5GC SUCI as described above for LTE UE 410. LTE MME 421 transfers the 5GC authentication token and random number to roaming network 440 for delivery to roaming UE 412. Roaming network 440 transfers the 5GC authentication token and random number to roaming UE 412. Roaming UE 412 processes the authentication token to authenticate 5GC/LTE network 400. Roaming UE 412 hashes its secret key with the random number and transfers the hash result to LTE MME 421 over roaming network 440 and roaming GW 425. LTE MME 421 matches the hash result to the expected result to authenticate roaming UE 412. In response to the 5GC authentication, LTE MME 421 directs roaming network 440 to serve roaming UE 412. LTE MME 420 may translate a decrypted IMSI for UE 412 into APNs and deliver the APNs to the roaming network. Roaming network 440 serves roaming UE 412 with an LTE data service in response to the signaling from LTE MME 421.

Advantageously, UEs 410-412 receive LTE data services based on their 5GC SUCIs. For user security, their 5GC SUCIs are encrypted when transferred over the air and over the backhaul/roaming links. Moreover, the QoS for the LTE data service is derived from the corresponding 5GC IMSI, so network 400 may deliver customized LTE QCIs to UEs 410-412 based on the 5GC IMSI.

Figure 5:
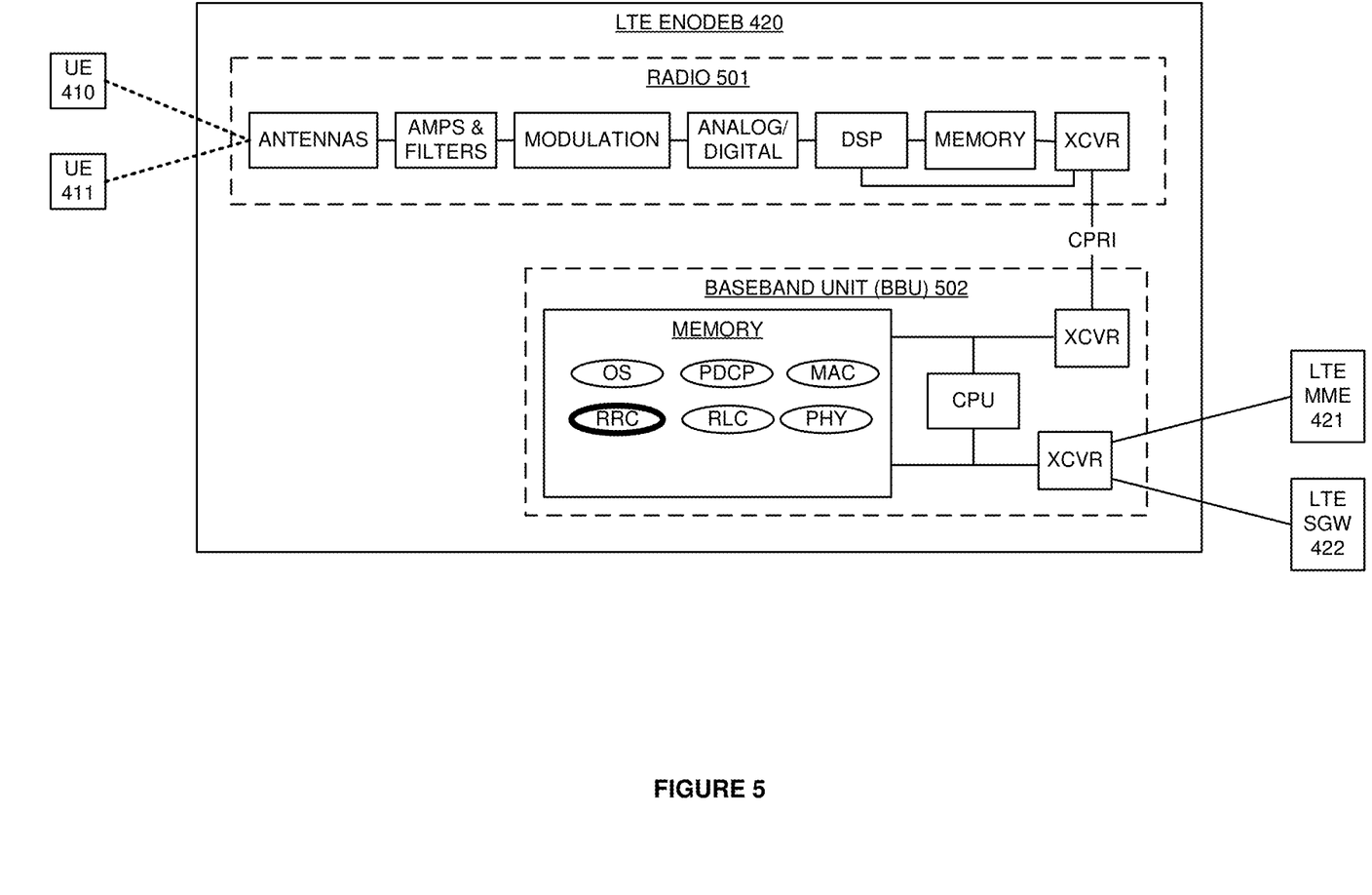
FIG. 5 illustrates an LTE eNodeB in the 5GC/LTE network that supports the authentication of the UEs for the LTE data service using their 5GC SUCIs which have their encrypted 5GC IMSIs.

FIG. 5 illustrates LTE eNodeB 420 in 5GC/LTE network 400 that authenticates UEs 410-411 for LTE data service using their 5GC SUCIs which have their encrypted 5GC IMSIs. LTE eNodeB 420 is an example of LTE eNodeB 120, although eNodeB 120 may differ. LTE eNodeB 420 comprises radio 501 and Baseband Unit (BBU) 502. Radio 501 comprises antennas, amplifiers, filters, modulation, analog-to-digital interfaces, DSP, and memory that are coupled over bus circuitry. BBU 502 comprises memory, CPU, and transceivers (XCVR) that are coupled over bus circuitry.

UEs 410-411 are wirelessly coupled to the antennas in radio 501 over LTE links. The transceiver in radio 501 is coupled to the transceivers in BBU 502 over Common Public Radio Interface (CPRI) links. The transceivers in BBU 502 are coupled to LTE MME 421 and LTE SGW 422 over backhaul links. The memory in BBU 502 stores an operating system, Physical Layer (PHY), Media Access Control (MAC), Radio Link Control (RLC), Packet Data Convergence Protocol (PDCP), and Radio Resource Control (RRC). The CPU in BBU 502 executes the operating system, PHY, MAC, RLC, PDCP, and RRC to drive the exchange of LTE signaling between UEs 410-411 and LTE MME 421 and to drive the exchange of user data between UEs 410-411 and LTE SGW 422.

In radio 501, the antennas receive wireless LTE signals from UEs 410-411 that transport Uplink (UL) LTE signaling and UL LTE data. Some of the UL LTE signaling includes 5GC SUCIs for UEs 410-411. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and UL LTE data. The CPU executes the RRC to process the UL LTE signaling and Downlink (DL) LTE signaling to generate new UL LTE signaling and new DL LTE signaling. The RRC transfers the new UL LTE signaling to LTE MME 421 over the backhaul links. The PDCP transfers the UL LTE data to LTE SGW 422 over the backhaul links. Some of the UL LTE signaling includes the 5GC SUCIs for UEs 410-411.

The transceivers in BBU 502 receive the DL LTE signaling from LTE MME 421 and receive DL LTE data from SGW 422. The CPU in BBU 502 executes the network applications to process the new DL LTE signaling and the DL LTE data to generate corresponding DL LTE symbols that carry the DL LTE signaling and DL LTE data. In radio 501, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling and DL LTE data to UEs 410-411.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The RRC in BBU 502 receives the 5GC SUCIs from UEs 410-411 and transfers the SUCIs to LTE MME 421. The RRC in BBU 502 receives authentic tokens and random numbers from LTE MME 421 and transfers the authentication tokens and random numbers to UEs 410-411 over radio 501. The RRC in BBU 502 receives the hash results from UEs 410-411 over radio 501 and transfers the hash results to LTE MME 421. The RRC in BBU 502 receives QCIs and IP addresses from LTE MME 421 for UEs 410-411 and transfers the QCIs and IP addresses to UEs 410-411 over radio 501. The PDCP in BBU 502 exchanges user data between UEs 410-411 and LTE SGW 422.

Figure 6:
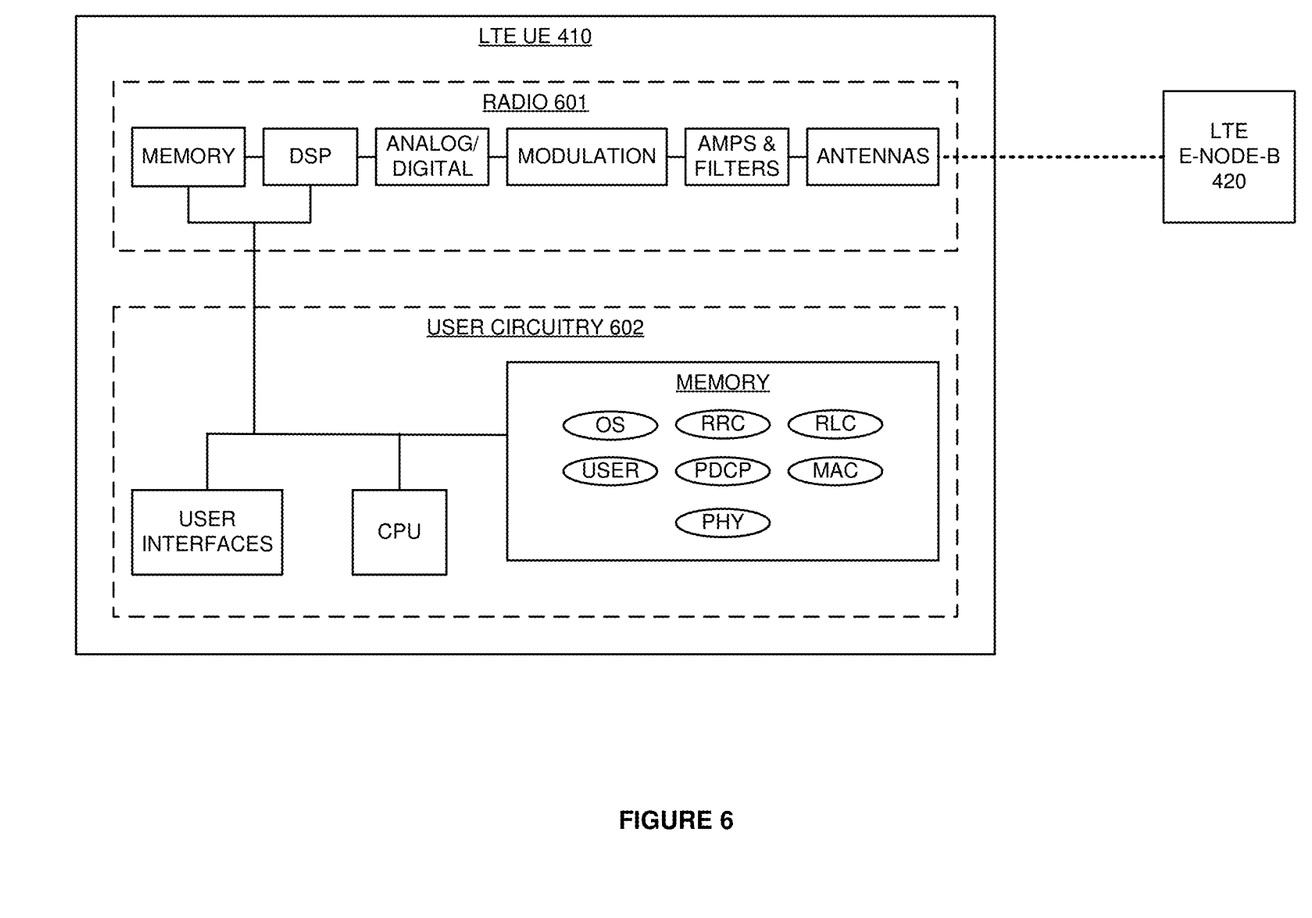
FIG. 6 illustrates the LTE UE in the 5GC/LTE network that is authenticated for the LTE data service using its 5GC SUCI which has its encrypted 5GC IMSI.

FIG. 6 illustrates LTE UE 410 in 5GC/LTE network 400 that is authenticated for the LTE data service using its 5GC SUCI which has its encrypted 5GC IMSI. LTE UE 410 is an example of wireless UE 110 and roaming UE 412, although UEs 110 and 412 may differ. LTE UE 410 is an example of 5GNR/LTE UE except that 5GNR UE 411 also comprises a 5GNR radio and 5GNR network applications. LTE UE 410 comprises radio 601 and user circuitry 602 that are coupled over bus circuitry.

Radio 601 comprises antennas, amplifiers, filters, modulation, analog-to-digital interfaces, DSP, and memory that are coupled over bus circuitry. User circuitry 602 comprises user interfaces, CPU, and memory that are coupled over bus circuitry. The antennas in radio 601 are wirelessly coupled to LTE eNodeB 420. The user interfaces in user circuitry 602 comprise graphic displays, machine controllers, sensors, cameras, transceivers, and/or some other user components. The memory in user circuitry 602 stores an operating system (OS), user applications (USER), and network applications (PHY, MAC, RLC, PDCP, and RRC). The CPU in user circuitry 602 executes the operating system and the user applications to generate and consume user data. The CPU in user circuitry 602 executes the operating system and the network applications to wirelessly exchange corresponding LTE signaling and LTE data with LTE eNodeB 420 over radio 601.

In radio 601, the antennas receive wireless LTE signals from LTE eNodeB 420 that transport DL LTE signaling and DL LTE data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL LTE symbols from the DL digital signals and transfers the DL LTE symbols to user circuitry 602. The CPU in user circuitry 602 executes the network applications to process the DL LTE symbols and recover the DL LTE signaling and the DL LTE data. The network applications transfer corresponding DL user data to the user applications over the operating system.

The network applications process the DL LTE signaling and user requirements to generate UL LTE signaling. The user applications transfer UL user data to the network applications over the operating system. The network applications process the UL LTE signaling and the UL LTE data to generate corresponding UL LTE symbols. The network applications transfer the UL LTE symbols to the DSP in radio 601. In radio 601, the DSP processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless signals that transport the UL LTE signaling and corresponding UL LTE data to LTE eNodeB 420.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/ removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The RRC in user circuitry 602 obtains a 5GC SUCI for LTE UE 420. For example, LTE UE 420 may receive the 5GC SUCI during a provisioning session (the LTE RRC in 5GNR/LTE UE 411 may receive the 5GC SUCI from its resident 5GNR network applications). The RRC transfers the 5GC SUCI to LTE eNodeB 420 in RRC attachment signaling. The RRC receives the authentic token and random number from LTE eNodeB 420. The RRC decrypts the authentication token with a key for 5GC/LTE network 400 to authenticate network 400. The RRC hashes the random number with its secret key. The RRC transfers the hash result to LTE eNodeB 420. The RRC receives QCIs and IP addresses. The RRC uses the IP addresses for LTE data exchanges with LTE eNodeB 420 per the QCIs.

Figure 7:
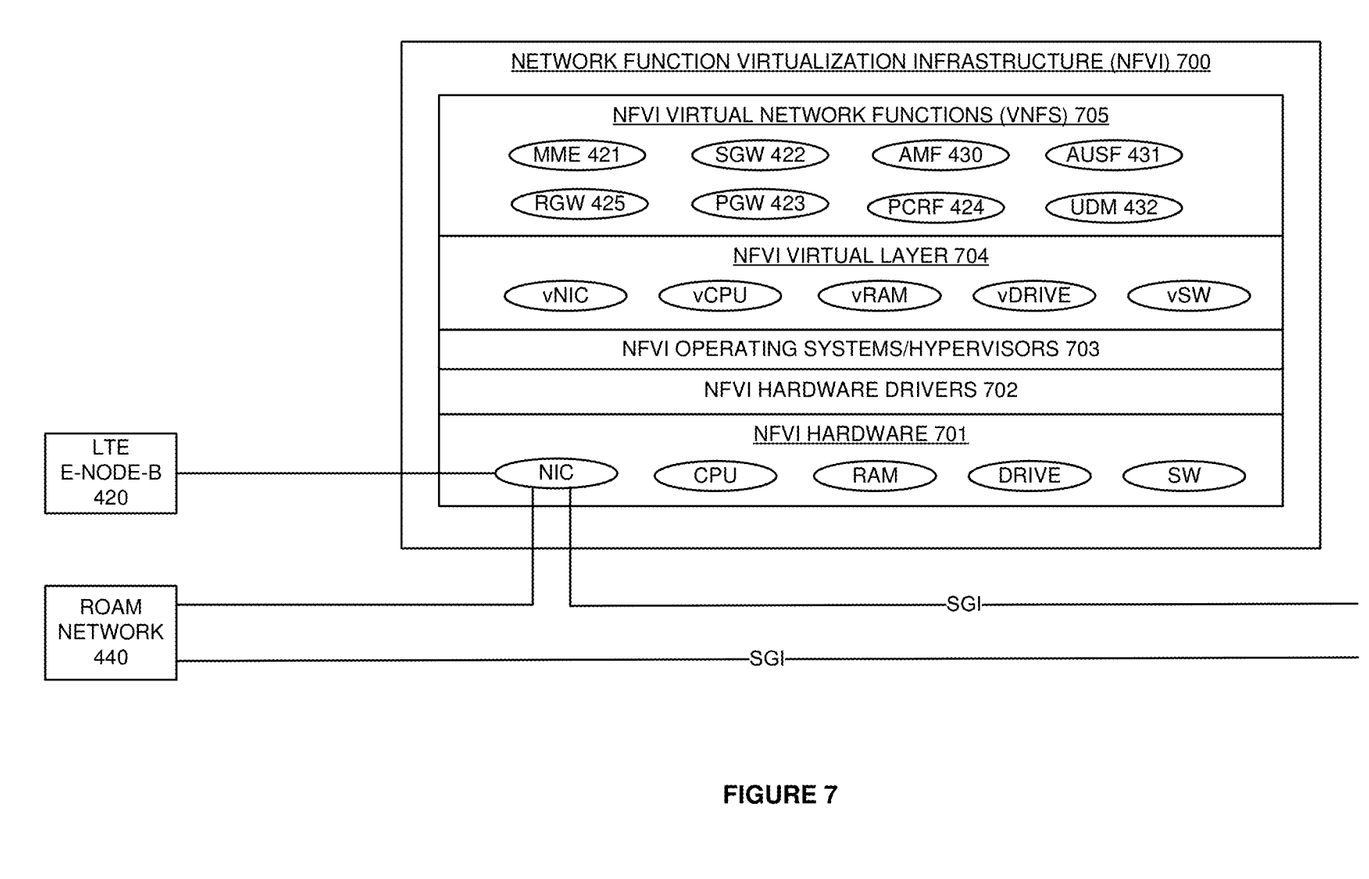
FIG. 7 illustrates a Network Function Virtualization Infrastructure (NFVI) in the 5GC/LTE network that authenticates the UEs for the LTE data service using their 5GC SUCIs which have their encrypted 5GC IMSIs.

FIG. 7 illustrates Network Function Virtualization Infrastructure (NFVI) 700 in 5GC/LTE network 400 that authenticates UEs 401-403 for the LTE data service using their 5GC SUCIs which have their encrypted 5GC IMSIs. 5G NFVI 700 is an example of LTE MME 121 and LTE GW system 122, although these network elements may differ. NFVI 700 comprises NFVI hardware 701, NFVI hardware drivers 702, NFVI operating systems and hypervisors 703, NFVI virtual layer 704, and NFVI Virtual Network Functions (VNFs) 705. NFVI hardware 701 comprises Network Interface Cards (NIC), CPU, RAM, flash/disk drives, and data switches (SWS). NFVI virtual layer 704 comprises virtual NICs (vNIC), virtual CPUs (vCPU), virtual RAM (vRAM), virtual Drives (vDRIVE), and virtual Switches (vSW).

The NIC is coupled to LTE eNodeB 420 over backhaul links and to roaming network 440 over network links. The NIC and roaming network 440 are coupled to external systems over SGi links. NFVI VNFs 705 comprise MME 421, SGW 422, PGW 423, PCRF 424, Roaming GW (RGW) 425, AMF 430, AUSF 431, and UDM 432. Other LTE and 5GC VNFs are typically present but are omitted for clarity. NFVI hardware 701 executes NFVI hardware drivers 702, NFVI operating systems and hypervisors 703, NFVI virtual layer 704, and NFVI VNFs 705 to serve UEs with the LTE data service over LTE eNodeB 420.

MME 421 receives the 5GC SUCI for UE 410 over LTE eNodeB 420 in a NAS file. In response to the 5GC SUCI, MME 421 transfers the 5GC SUCI to AMF 430 over a virtualized 5GC N26 link. AMF 430 transfers the 5GC SUCI to AUSF 431 over a virtualized Nausf link. AUSF 431 transfers the 5GC SUCI to UDM 432 over a virtualized Nudm link. UDM 432 decrypts the 5GC SUCI into the 5GC SUPI which is the IMSI for UE 410 in this example. UDM 432 generates a 5GC authentication vector for the IMSI based on the secret key for UE 410. UDM 432 transfers the 5GC IMSI and the 5GC authentication vector to AUSF 431. AUSF 431 transfers the 5GC IMSI and the 5GC authentication vector to AMF 430. AMF 430 transfers the 5GC IMSI and the 5GC authentication vector to MME 421. MME 421 transfers the 5GC authentication token and random number to LTE eNodeB 420 for delivery to LTE UE 410. LTE MME 421 receives a hash result from UE 410 over LTE eNodeB 420. LTE MME 421 matches the hash result to the expected result to authenticate LTE UE 410.

In response to the 5GC authentication, LTE MME 421 accesses an HSS (not shown) to translate the IMSI into APNs. LTE MME 421 transfers signaling to SGW 422 indicating the IMSI and the APNs. SGW 422 transfers signaling to PGW 423 indicating the IMSI and the APNs. PGW 423 transfers signaling to PCRF 424 indicating the IMSI and the APNs. PCRF 424 translates the IMSI and the APNs into QCIs and returns the QCIs. PGW 423 selects IP addresses for LTE/IP tunnels between UE 410 and PGW 423. PGW 423 transfers the QCIs and IP addresses to SGW 422. SGW 422 transfers the QCIs and IP addresses to MME 421. MME 421 transfers signaling to LTE eNodeB 420 indicating the QCIs and network addresses for UE 410. Using the IP addresses, SGW 422 and PGW 423 exchange user data for UE 410 per the QCIs.

The authentication would be similar for roaming network 440. Roaming network 440 transfers a 5GC SUCI for roaming UE 412 to MME 421 over RGW 425. MME 421 handles the 5GC SUCI as described above for UE 410. LTE MME 421 transfers the 5GC authentication token and random number to roaming network 440 for delivery to roaming UE 412. Roaming network 440 transfers the hash result for roaming UE 412 to MME 421 over RGW 425. MME 421 matches the hash result to the expected result to authenticate roaming UE 412. In response to the 5GC authentication, MME 421 directs roaming network 440 over RGW 425 to serve roaming UE 412. MME 421 may translates the IMSI into APNs and deliver the APNs to roaming network 440 as well.

Figure 8:
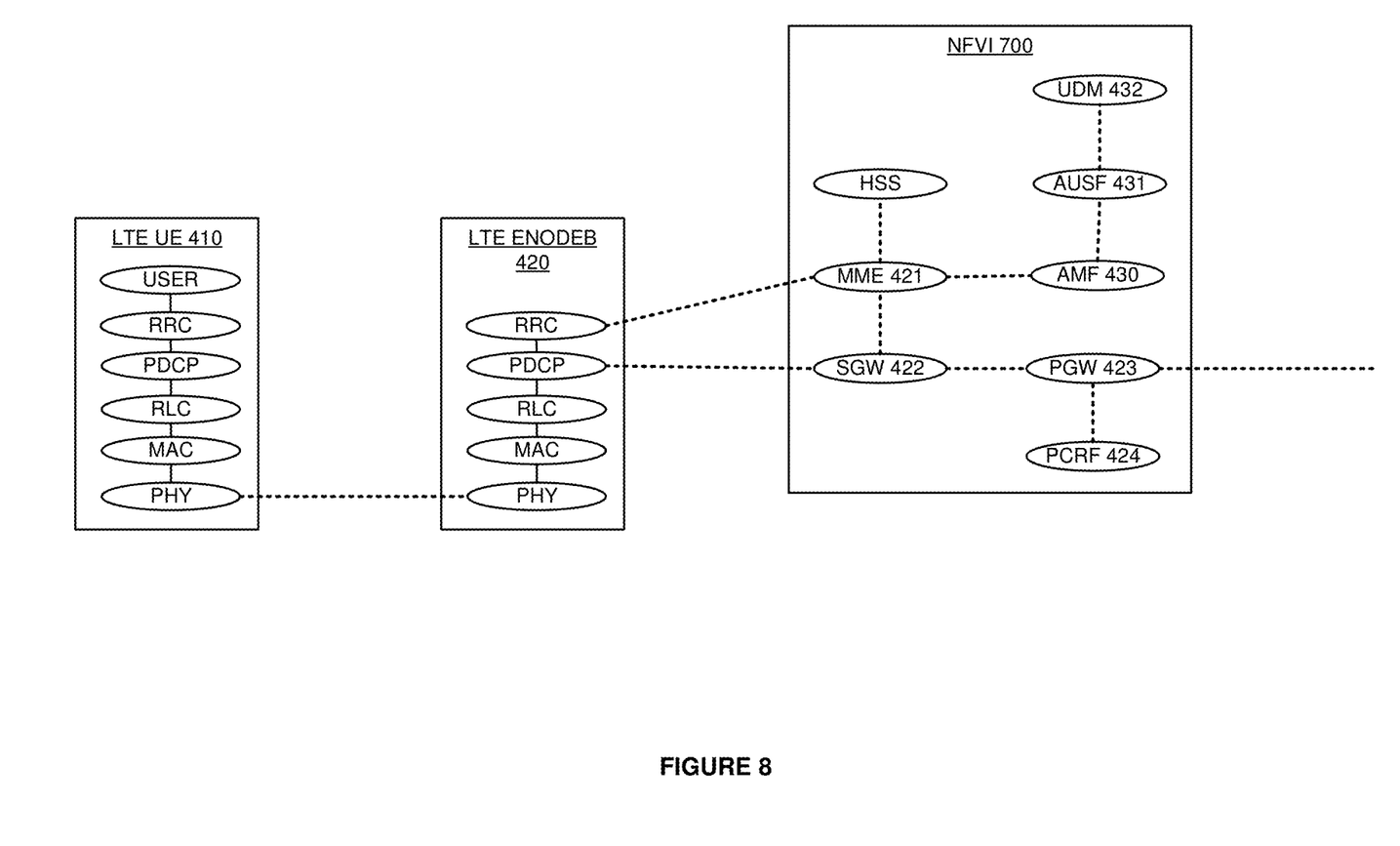
FIG. 8 illustrates the operation of the LTE UE, LTE eNodeB, and NFVI to authenticate the LTE UE for the LTE data service using its 5GC SUCI which has their encrypted 5GC IMSIs.

FIG. 8 illustrates the operation of LTE UE 410, LTE eNodeB 420, and NFVI 700 to authenticate LTE UE 410 for the LTE data service using its 5GC SUCI which has its encrypted 5GC IMSI. The user applications in LTE UE 410 request data communication service. In response, the RRC in UE 410 transfers the 5GC SUCI to the RRC in LTE eNodeB 420 over their PDCPs, RLCs, MACs, and PHYs. The RRC in LTE eNodeB 420 transfers the 5GC SUCI to MME 421 in NFVI 700. MME 421 transfers the 5GC SUCI to AMF 430. AMF 430 transfers the 5GC SUCI to AUSF 431, and AUSF 431 transfers the 5GC SUCI to UDM 432. UDM 432 decrypts the 5GC SUCI into the 5GC IMSI for UE 410. UDM 432 generates a 5GC authentication vector for the IMSI based on the secret key. UDM 432 transfers the 5GC IMSI and the 5GC authentication vector to AUSF 431. AUSF 431 transfers the 5GC IMSI and the 5GC authentication vector to AMF 430. AMF 430 transfers the 5GC IMSI and the 5GC authentication vector to MME 421. MME 421 transfers the 5GC authentication token and random number from the authentication vector to the RRC in LTE eNodeB 420. The RRC in LTE eNodeB 420 wirelessly transfers the 5GC authentication token and random number to the RRC in LTE UE 410 over their PDCPs, RLCs, MACs, and PHYs. The RRC in LTE UE 410 decrypts authentication token with a key for 5GC/LTE network 400 to authenticate network 400. The RRC in LTE UE 410 hashes its secret key with the random number. The RRC wirelessly transfers the hash result to the RRC in LTE eNodeB 420 over their PDCPs, RLCs, MACs, and PHYs. The RRC in LTE eNodeB 420 transfers the hash result to MME 421 in NFVI 700. MME 421 matches the hash result to the expected result to authenticate LTE UE 410.

In response to the 5GC authentication, MME 421 accesses an HSS (not shown) to translate the IMSI into APNs. MME 421 transfers the IMSI and the APNs to SGW 422. SGW 422 transfers the IMSI and the APNs to PGW 423. PGW 423 transfers the IMSI and the APNs to PCRF 424. PCRF 424 translates the IMSI and the APNs into QCIs and returns the QCIs to PGW 423. PGW 423 selects IP addresses for LTE/IP tunnels between UE 410 and PGW 423. PGW 423 transfers the QCIs and the IP addresses to SGW 422. SGW 422 transfers the QCIs and the IP addresses to MME 421. MME 421 transfers the QCIs and the network addresses for UE 410 to the RRC in LTE eNodeB 420. The RRC in LTE eNodeB 420 transfers the QCIs and the network addresses to UE 410 over their PDCPs, RLCs, MACs, and PHYs.

The PDCP in LTE UE 410 exchanges user data with the user applications. The PDCP in LTE UE 410 exchanges the user data with the PDCP in LTE eNodeB 420 over their RLCs, MACs, and PHYs per the QCIs. The PDCP in LTE eNodeB 420 exchanges the user data with SGW 422 in NFVI 700 per the QCIs. SGW 422 exchanges the user data with PGW 423 per the QCIs. PGW 423 exchanges the user data with external systems per the QCIs.

The wireless data network circuitry described above comprises computer hardware and software that form special-purpose network circuitry to authenticate wireless UEs for LTE data service using 5GC SUCIs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to authenticate wireless UEs for LTE data service using 5GC SUCIs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Fifth Generation Core (5GC) Long Term Evolution (LTE) network to authenticate a wireless User Equipment (UE) for LTE data service using a 5GC Subscriber Concealed Identifier (SUCI), the method comprising:
   an LTE Mobility Management Entity (MME) receiving the 5GC SUCI for the wireless UE and responsively transferring the 5GC SUCI to a 5GC authentication system;
   the 5GC authentication system receiving and processing the 5GC SUCI, and in response, determining a 5GC Subscriber Permanent Identifier (SUPI) and 5GC authentication vector for the wireless UE and transferring the 5GC SUPI and the 5GC authentication vector to the LTE MME;
   the LTE MME receiving the 5GC SUPI and the 5GC authentication vector and responsively exchanging 5GC authentication data with the wireless UE; and
   the LTE MME authenticating the wireless UE based on the 5GC authentication vector and the 5GC authentication data, and in response to the 5GC authentication, initiating the LTE data service for the wireless UE based on the 5GC SUPI.

2. The method of claim 1 wherein:
   the LTE MME exchanging the 5GC authentication data with the wireless UE comprises the LTE MME exchanging the 5GC authentication data with the wireless UE over an LTE evolved-NodeB (eNodeB); and further comprising
   the LTE MME signaling the LTE eNodeB to wirelessly serve the wireless UE with the LTE data service responsive to the 5GC authentication; and
   the LTE eNodeB wirelessly serving the LTE data service to the wireless UE responsive to the signaling from the LTE MME.

3. The method of claim 2 further comprising the LTE eNodeB wirelessly receiving the 5GC SUCI from the wireless UE and transferring the 5GC SUCI to the LTE MME.

4. The method of claim 3 wherein the LTE eNodeB wirelessly receiving the 5GC SUCI from the wireless UE and transferring the 5GC SUCI to the LTE MME comprises the LTE eNodeB wirelessly receiving the 5GC SUCI from the wireless UE in LTE Radio Resource Control (RRC) signaling and transferring the 5GC SUCI to the LTE MME in S1-MME signaling.

5. The method of claim 4 wherein the LTE eNodeB wirelessly receiving the 5GC SUCI from the wireless UE in the RRC signaling and transferring the 5GC SUCI to the LTE MME in the S1-MME signaling comprises the LTE eNodeB wirelessly receiving the 5GC SUCI from the wireless UE in Non-Access Stratum (NAS) signaling and transferring the 5GC SUCI to the LTE MME in the NAS signaling.

6. The method of claim 1 wherein the LTE MME initiating the LTE data service for the wireless UE based on the 5GC SUPI comprises translating the 5GC SUPI into one or more LTE Access Point Names (APNs).

7. The method of claim 1 wherein the 5GC SUPI comprises a 5GC International Mobile Subscriber Identifier (IMSI).

8. The method of claim 1 wherein the 5GC authentication system comprises an Access and Mobility Management Function (AMF).

9. The method of claim 1 wherein the 5GC authentication system comprises an Authentication and Security Function (AUSF).

10. The method of claim 1 wherein the 5GC authentication system comprises a Unified data Manager (UDM).

11. A Fifth Generation Core (5GC) Long Term Evolution (LTE) network to authenticate a wireless User Equipment (UE) for LTE data service using a 5GC Subscriber Concealed Identifier (SUCI), the 5GC/LTE network comprising:
an LTE Mobility Management Entity (MME) configured to receive the 5GC SUCI for the wireless UE and responsively transfer the 5GC SUCI to a 5GC authentication system;
the 5GC authentication system configured to receive and process the 5GC SUCI, and in response, determine a 5GC Subscriber Permanent Identifier (SUPI) and 5GC authentication vector for the wireless UE and transfer the 5GC SUPI and the 5GC authentication vector to the LTE MME;
the LTE MME configured to receive the 5GC SUPI and the 5GC authentication vector and responsively exchange 5GC authentication data with the wireless UE; and
the LTE MME configured to authenticate the wireless UE based on the 5GC authentication vector and the 5GC authentication data, and in response to the 5GC authentication, initiate the LTE data service for the wireless UE based on the 5GC SUPI.

12. The 5GC/LTE network of claim 11 wherein:
the LTE MME is configured to exchange the 5GC authentication data with the wireless UE over an LTE evolved-NodeB (eNodeB);
the LTE MME is configured to signal the LTE eNodeB to wirelessly serve the wireless UE with the LTE data service responsive to the 5GC authentication; and
the LTE eNodeB is configured to wirelessly serve the LTE data service to the wireless UE responsive to the signaling from the LTE MME.

13. The 5GC/LTE network of claim 12 further comprising the LTE eNodeB configured to wirelessly receive the 5GC SUCI from the wireless UE and transfer the 5GC SUCI to the LTE MME.

14. The 5GC/LTE network of claim 13 wherein the LTE eNodeB is configured to wirelessly receive the 5GC SUCI from the wireless UE in LTE Radio Resource Control (RRC) signaling and transfer the 5GC SUCI to the LTE MME in S1-MME signaling.

15. The 5GC/LTE network of claim 14 wherein the LTE eNodeB is configured to wirelessly receive the 5GC SUCI from the wireless UE in Non-Access Stratum (NAS) signaling and transfer the 5GC SUCI to the LTE MME in the NAS signaling.

16. The 5GC/LTE network of claim 11 wherein the LTE MME is configured to translate the 5GC SUPI into one or more LTE Access Point Names (APNs).

17. The 5GC/LTE network of claim 11 wherein the 5GC SUPI comprises a 5GC International Mobile Subscriber Identifier (IMSI).

18. The 5GC/LTE network of claim 11 wherein the 5GC authentication system comprises an Access and Mobility Management Function (AMF).

19. The 5GC/LTE network of claim 11 wherein the 5GC authentication system comprises an Authentication and Security Function (AUSF).

20. The 5GC/LTE network of claim 11 wherein the 5GC authentication system comprises a Unified data Manager (UDM).

* * * * *